Patented Dec. 15, 1953

2,662,898

UNITED STATES PATENT OFFICE 2,662,898

ALKANOL-ETHER-IMIDES OF LONG-CHAIN ALIPHATIC DICARBOXYLIC COMPOUNDS

John Ross, Ramsey, and Arthur Ira Gebhart, Union, N. J., assignors to Colgate-Palmolive-Peet Company, Jersey City, N. J., a corporation of Delaware No Drawing. Application September 20, 1949, Serial No. 116,854

5 Claims. (Cl. 260—326.5)

The present invention relates to new compounds which have useful surface-active properties and which are also useful as intermediates in organic syntheses, and more particularly to novel alkanol-ether derivatives of certain organic aliphatic imides and to processes for preparing the same.

The novel surface-active compounds of this invention are alkanol-ether-imides of condensation products of long-chain olefinic, preferably mono olefinic, hydrocarbons with aliphatic dicarboxylic compounds, viz, aliphatic dicarboxylic acids, esters or anhydrides having an alpha-beta-enal group. Compounds of this character which have been found to be of particular value are such as are formed by treating imides of condensation products, for example products resulting from the condensation of long-chain olefins with maleic anhydride, with alkanol-ether halohydrins or suitable alkene oxide derivatives thereof. The compounds may be represented graphically by the following general formula:

(1)
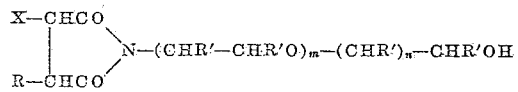

where X represents a carbon chain of about 8 to about 24 carbon atoms, and preferably 12 to 18 carbons which chain may be saturated, unsaturated, substituted or unsubstituted; R is hydrogen or a short-chain alkyl group of from 1 to about 3 carbon atoms; R' is hydrogen or a short-chain alkyl group or hydroxy substituted alkyl group of about 1 to 3 carbon atoms; $m$ is a small integer from 1 to 3; and $n$ is a small integer from 1 to 4.

In accordance with the present invention it has been found that the incorporation of a small proportion of surface-active alkanol-ether-imides of condensation products of long-chain olefins with aliphatic dicarboxylic compounds, viz, aliphatic dicarboxylic acids, esters and anhydrides having an alpha-beta-enal group with a non-soap detergent, emulsifier and wetting agent of the type of sulphonated or sulphated organic materials provides a composition which in aqueous solution possesses greatly improved sudsing, deterging and foaming properties.

The surface-active alkanol-ether-imides referred to are novel compounds and may be prepared for incorporation in non-soap detergents as aforementioned, or for other purposes, by condensing a suitable nitrogen base with a simple condensation product of a long-chain olefin and an aliphatic dicarboxylic compound, viz, an aliphatic dicarboxylic acid, ester, or an anhydride having an alpha-beta-enal group, followed by treating the resulting product with a hydroxy-ether-halohydrin to form the corresponding alkanol-ether-imide derivative. The compounds of the invention may also be prepared by reaction of the imide of the condensation product with alkene oxide, such as ethylene oxide, to first form the alkanol derivative, and then reacting this alkanol derivative with more alkene oxide to introduce additional alkoxy groups to thus form an alkanol-ether-imide compound.

The sulphated or sulphonated organic materials employed in the novel compositions according to the present invention may be prepared from organic materials which are applicable for sulphonation (true "sulphonation" and/or sulphation), especially those having about 8 to about 24 (and preferably about 12 to about 18) carbon atoms to the molecule, including fatty oils, unsaturated fatty acids, mineral oils, mineral oil extracts, mono- and diglycerides, partial esters or ethers of glycols, polyglycols, and polyalcohols, aromatic and alkylated aromatic compounds, alcohols and olefins, coal tar distillates, and numerous other organic compounds and mixtures of compounds. Such compounds can be sulphonated by any of several methods and may form any of several products, depending upon the method of sulphonation employed. The sulphonated or sulphated organic compounds include sulphonated mineral oil or conventional mineral oil refinery sludges; sulphonated mineral oil extracts; sulphonated fatty acids and oils, including sulphonated castor oil, sulphorricinoleic acid, sulphonated olive and sulpho-oleic acid, aliphatic sulphonates and sulphates, including cetyl sulphuric acid, dodecyl acid sulphate, and tetradecanehydroxy sulphonic acid-1,2; aliphatic ether and ester sulphonates including the dodecyl ether of hydroxy ethyl sulphonic acid, the cetyl ether of glyceryl sulphonic acid, and coconut oil monoglyceride monosulphate; sulphonates prepared by treatment of organic materials with sulphur dioxide and chlorine in the presence of light followed by hydrolysis of the product; sulphonates prepared by treatment of organic bodies with sulphuryl chloride and an activating agent in the presence of light followed by hydrolysis of the product; fatty acid; fatty acid amides of amino alkyl sulphonic acids, including lauric amide of taurine and tall oil acid amide of amino glyceryl sulphonic acid; sulphonic acids of naphthenes and naphthenic acids; lignin sulphonic acids; aromatic and alkylated aromatic sulphonic acids, including naphthalene sulphonic acid, octadecyl benzene sulphonic acid, and dodecyl naphthalene sulphonic acid; the product of a mineral oil extract sulphonated while dissolved in liquid sulphur dioxide; and innumerable other organic sulphonic and sulphuric acid derivatives or mixtures thereof. These organic sulphate and true sulphonate compounds include those in which the organic radicals of the molecule are unsubstituted or those which contain substituents, such as halogens, hydroxyls, nitrogen-containing groups, acyl groups, acyloxy groups, alkoxy groups etc. Of these sulphated and sulphonated materials, the most suitable for inclusion in the novel compositions of the present invention are normally non-alkaline (having a pH below 7.0), and especially those having carboxylic ester linkages, including the sodium salts of the sulphuric acid esters of coconut oil fatty acid monoglycerides, tallow diglycerides monosulphate, etc.

The imides of the condensation products from which the alkanol-ether-imides are obtained include those having from about 12 to about 28 and preferably about 16 to about 22 carbon atoms per molecule. The carbon chains or the imide molecule may be straight or branched, saturated or unsaturated, and they may be either unsubstituted or substituted by substituents such as halogens, hydroxyl, acyl groups, acyloxy groups, alkoxy groups, aryl groups, etc., although it is generally preferred that any substituent groups that are of a hydrophilic character be located near or adjacent to the imide group. The alkanol-ether-imides employed in the process of this invention may also include compounds having cyclic substituents containing in addition an aliphatic side chain of about 8 to 24 carbon atoms, although such compounds are generally not a preferred type.

While the alkanol-ether-imide compounds, when used as organic builders in non-soap synthetic detergents as referred to heretofore may be added in amounts varying from about 0.01% to about 50% by weight based upon the active ingredients of the detergent composition, it is preferred to incorporate from 0.1% to about 20%, and preferably about 1% to 10% by weight of the active ingredients. The optimum proportion employed will vary with the particular active ingredients used; with the proportion of other ingredients present, if any, and to some degree with the strength or concentration of the solution to be formed in use.

The organic builder may be incorporated with the other active ingredient or mixture to form the novel composition of this invention at any point during the manufacturing process at which subsequent operations will not destroy or objectionably modify the builder or cause a deleterious reaction between the builder and any other material in the composition. In general, it is preferred to add the builder at a point in the manufacturing subsequent to the hydrolyzing and/or neutralizing step. This may be accomplished by adding the organic builder to solutions containing the other active ingredient or ingredients by mixing the builder with the solid active ingredient in comminuted form, or by adding the builder to a solution of the active ingredient and thereafter subjecting the solution containing active ingredient and organic builder to spray-drying, roll-drying, etc., to form a solid composition.

Thus the novel compositions may be made up in solutions preferably concentrated, or a dry or partially hydrated solid product may be formed. The product may be made in a more or less finely divided condition, which permits its ready transformation into flakes or other physical forms, for example by passing between a pair of properly spaced rolls, or by pressing into cakes, or by other means, with or without addition of modifying agents.

Adjuvant materials may be admixed with the sulphonate salts by mixing the adjuvant materials with the sulphonated organic compounds and/or the neutralizing agents before neutralization or flashing, by simultaneously flashing a second solution containing such adjuvant materials, and/or by mixing the final product therewith. When added after neutralization, the adjuvant materials may be added before, after, or simultaneously with the organic builder. Such adjuvant material may include any of the substances employed by the art in admixture with sulphonated organic detergents generally, care being exercised to avoid the use of any material which would remove or otherwise substantially diminish the effectiveness of the particular organic builder incorporated. The type of addition agent will depend upon the intended ultimate use of the new composition.

In preparing the alkanol-ether-imide compounds of this invention the starting material is a condensation product such as may be produced, for example, by reacting maleic anhydride with a monoolefinic hydrocarbon for example hexadecene, at temperatures of between 200 and 250° C. Instead of hexadecene there may be used non-conjugated poly-olefinic acids or esters. Examples of other olefinic compounds as well as other aliphatic dicarboxylic compounds, viz, aliphatic dicarboxylic acids, esters, and anhydrides having an alpha-beta-enal group which are suitable for use in this invention may be found in the copending patent application, Serial Number 693,571, filed August 28, 1946, by John Ross et al., now U. S. Patent 2,496,358, issued on February 7, 1950, to which further reference may be made. The dicarboxylic anhydride olefinic condensation product or a mixture of condensation products as thus formed is then treated with ammonia to form the imide derivative. If desired, the double bond or bonds of the dicarboxylic olefinic condensation product or mixture of condensation products may be suitably hydrogenated or hydroxylated to form the saturated derivatives, or saturated substituted derivatives thereof, which in turn are reacted with ammonia to form the corresponding imide of the condensation product. The imide of the condensation product thus formed then is reacted with the appropriate hydroxy-ether halohydrin, such as β-chlor-β'-hydroxy ethyl ether, γ-chlor-γ'-hydroxy-propyl ether, or similar bromhydrin compounds, or alkene oxide derivatives to form the desired alkanol-ether-imide compounds. A modified method which also may be employed comprises reacting the sodium or potassium salt of the imide of the condensation product with a halohydrin, such as ethylene chlorhydrin to form the corresponding alkanolimide derivative, and then reacting this resultant alkanolimide with alkene oxide to form the alkanol-ether-imide compound. Imides of the various long-chain condensation products may be treated in this manner to form novel surface-active agents where the imide group is adjacent to one end of the long carbon chain.

The olefinic dicarboxylic compound condensation product is converted into the corresponding imide by reacting the same under substantially anhydrous conditions with dry ammonia gas. The conversion of the maleic anhydride hexadecene condensation product to the corresponding imide may be illustrated graphically as follows, starting with Δ4,5-octadecene-1,2-dicarboxylic acid anhydride for example:

(2)

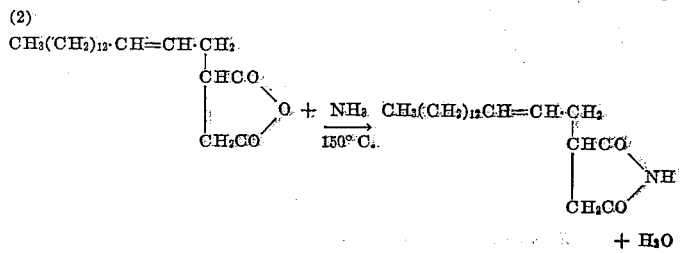

Upon reacting the imide, or preferably the salt thereof, such as the potasium salt of the imide derivative, with for example β-chlor-β'-hydroxy-diethyl ether the corresponding ethanolimide compound is formed as follows:

(3)

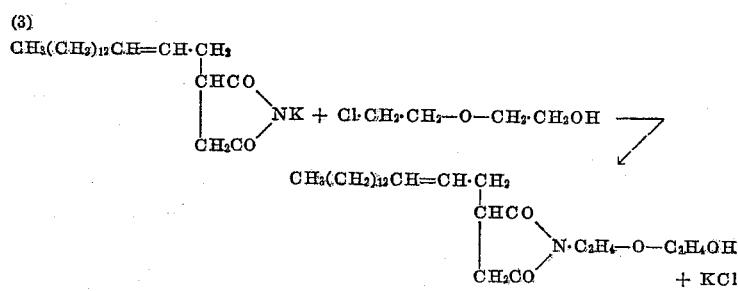

When the ethanol-ether imide derivatives are prepared using a short-chain aliphatic compound containing an epoxy oxygen atom as reactants, an excess of the alkene oxide is employed to form the polyethylene ether derivatives or substituted polyethylene ether derivatives according to the following equations, wherein $m$ is a small integer of from 1 to 3. Starting with Δ-4,5-octadecene-1,2-dicarboxylic acid imide for example:

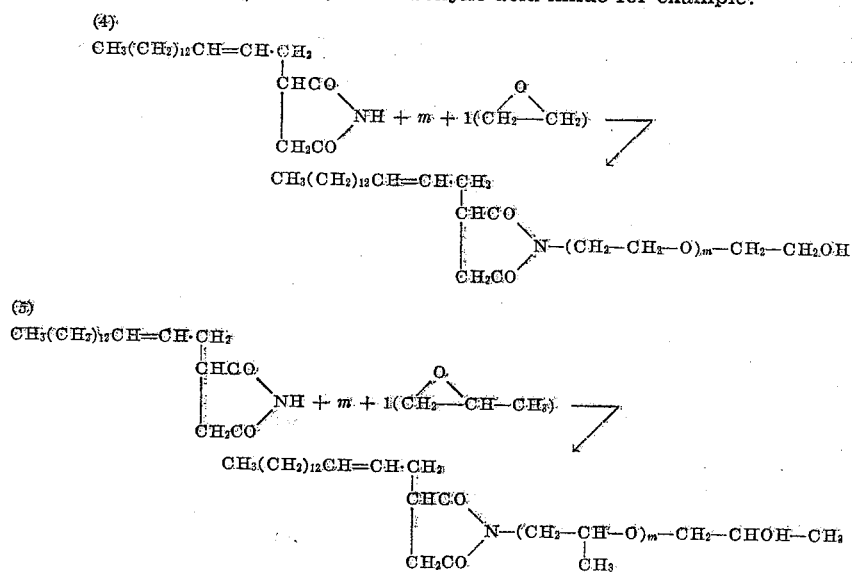

A two-step method may be employed wherein the alkali metal salt of the imide is first treated with halohydrin to form the corresponding alkanolamine derivative, and then this resultant alkanol product is reacted with alkene oxide to form the alkanol-ether-imide compound. The alkali metal salt of the dicarboxylic imide condensation product may be converted to the salt, for example the potasium salt, by dissolving the imide condenstion product in ethyl alcohol and adding alcoholic KOH. The two-step method starting with the potassium salt may be graphically illustrated as follows:

(6) (a)

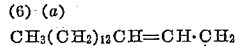
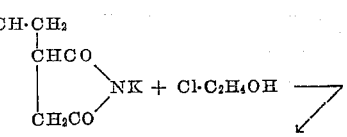

(b)

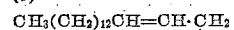
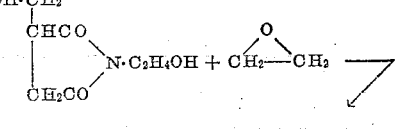
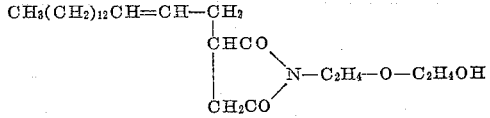

The alkanol-ether-imides as prepared according to this invention possess uniquely desirable properties as organic builders, and are particularly valuable as foaming stabilizers. Further, the novel compounds and compositions formed therefrom as herein disclosed exhibit surface-active properties in both acid and alkaline media, apparently changing from a substantially neutral character to a non-ionized or an ionic form.

The compounds and compositions provided may be made up in solutions, either concentrated or diluted, or as dehydrated or as partially solid product. Adjuvant materials may be also admixed with the new compounds or compositions made therefrom to form flakes, granular particles, cakes or other desired physical forms. Such adjuvant materials as sodium chloride, sodium sulfate, sodium pyrophosphate and the like builders and fillers as may be employed in the soap and synthetic detergent art may be utilized for this purpose. The particular type of addition agent used in any case will depend on the ultimate use and character of the product desired.

The following examples are given to illustrate how the present invention is utilized but it is to be understood that the invention is not limited thereto. The parts specified are by weight.

Example I

A quantity of Δ4,5-octadecene-1,2 dicarboxylic acid anhydride, which may be prepared as described in the patent to John Ross et al. supra, is heated to 150° C. and dry ammonia gas reacted therewith to convert the anhydride to the imide, water being formed during the reaction which is distilled off. The resultant imide derivative is then reacted with β-chlor-β' hydroxy-ethyl ether to form the corresponding alkanol-ether-imide, the reactants being used in equal molecular proportions and employing sufficient sodium hydroxide to combine with the hydrochloric acid produced. The resulting condensation product is principally β-hydroxy-ethyl ether of Δ4,5-octadecene-1,2 dicarboxylic acid ethanolimide which forms a waxy solid and is characterized by its excellent surface-active properties and valuable utility as an organic builder.

Example II

A quantity of Δ4,5-tetradecene 1,2 dicarboxylic acid anhydride is heated above its melting point and dry ammonia gas is bubbled into the molten mass until no more ammonia is absorbed. This takes approximately one hour, during which time the temperature is gradually raised. The reaction mass is thereafter allowed to cool and the solid reaction product comprising the resultant dicarboxylic acid imide is then heated to form a melt and reacted with β-chlor-β'-hydroxyethyl ether, the reactants being used in approximately equal molecular proportions, and with sufficient sodium hydroxide being added to combine with the hydrochloric acid formed during the reaction. The resulting product consists mostly of the β-hydroxy-ethyl-ether derivative of Δ4,5 tetradecene-1-dicarboxylic acid imide, which product is soluble in water and is characterized by its surface-active properties and good builder characteristics.

Example III

A quantity of Δ4,5-octadecene 1,2 dicarboxylic acid anhydride is heated to 150° C. and dry ammonia reacted therewith to form the imide derivative, as described in Example I. The resultant imide condensation product is then dissolved in ethyl alcohol and converted to the potassium salt by the addition of alcoholic KOH. The potassium salt of the imide is thereafter reacted with ethylene chlorohydrin to form the ethanolimide derivative. After removal of KCl the resultant ethanolimide derivative is treated with ethylene oxide to form the corresponding ethanol-ether derivative of Δ4,5-octadecene 1,2 carboxylic acid imide condensation product.

The alkanol-ether-imide derivatives prepared as described may be used alone as desired or may be sulphated and thus utilized, or admixed with sulphated or sulphonated non-soap substances to enhance their emulsifying and detergent properties as described. When employing the novel compounds of the present invention as organic builders, additions of from 0.01% to about 50% of the weight of the active ingredients in the surface-active composition may be made, but it is preferred to incorporate about 1% to 20% of organic builder based upon the weight of active ingredients.

In order to illustrate more clearly how the novel compounds of the invention may be utilized as organic builders in detergent compositions there is set forth the following examples:

Example A

To a synthetic detergent composition comprising about 40 parts by weight of sodium salt of sulphuric acid ester of monoglycerides (of coconut oil fatty acids) and about 60 parts of sodium sulphate is added 10 parts of β-hydroxy-ethyl ether of Δ4,5-octadecene-1,2 dicarboxylic acid ethanolimide. Sufficient water is added to form a solution of the mixture and the solution is then spray dried to produce a solid detergent composition having improved detergency characteristics.

Example B

Twenty-five parts of β-hydroxy-ethyl-ether derivative of Δ4,5 tetradecene-1-dicarboxylic acid imide (Example II) is added to 100 parts of sodium lauryl sulphate to form a synthetic detergent composition which exhibits good foaming and sudsing characteristics.

Example C

The alkanol-ether-imide condensation product consisting principally of β-hydroxy-ethyl-ether of 4,5-octadecene-1,2 dicarboxylic acid ethanolimide is heated to form a melt and spray cooled to transform it into discrete particles. The molten alkanol-ether-imide is spray cooled to form pellets by suitably forcing the melted material through a spray nozzle arranged in a spray chamber, and in which a current of cooling air is kept moving to cool and solidify the dispersed droplets of the alkanol-ether-imide as discharged from the spray nozzle.

The use of the term "sulphonated" with reference to organic compounds in the following claims will be understood to include sulphated as well as "true sulphonated" materials.

While various specific examples of preferred compositions and methods embodying the present invention have been described, it will be apparent to those skilled in the art that many changes and modifications may be made in the methods of procedure and that a wide variety of specific reagents may be employed to carry out the procedure. It is accordingly to be understood that the examples given and the particular proportions and details of the method procedure as set forth are intended to be illustrative only, and are not limitative of the scope of the invention, except as defined by the appended claims.

What is claimed is:

1. A new chemical compound of the following formula:

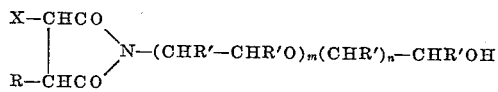

where X represents a carbon chain of about 8 to 24 carbon atoms, R is a material selected from the group consisting of hydrogen and short-chain alkyl groups of from 1 to 3 carbon atoms, R' is a material selected from the group consisting of hydrogen and short-chain alkyl groups and hydroxy substituted alkyl group of about 1 to 3 carbon atoms, $m$ is a small integer from 1 to 3 and $n$ is a small integer from 1 to 4.

2. As a new composition of matter, a chemical compound as described in claim 1 which is in the form of discrete particles.

3. A process for preparing long-chain alkanol-etherimide compounds which comprises condensing a long-chain olefin with an aliphatic 1,2 dicarboxylic compound having an alpha-beta-enal group, said dicarboxylic compound having a substituent selected from the group consisting of hydrogen and an alkyl group having 1 to 3 carbon atoms, reacting the resultant condensation product with ammonia to produce an imide of said condensation product, converting said imide condensation product to a salt selected from the group consisting of the sodium and potassium salts of the said imide condensation product, reacting the salt of said imide condensation product with an alkyl halohydrin to produce an alkanol-imide derivative, and reacting the resultant alkanolimide compound with an alkene oxide to form the alkanol-ether-imide derivative.

4. A process for preparing an alkanol-ether-imide which comprises condensing an olefinic hydrocarbon compound having 8 to 24 carbon atoms per molecule with an aliphatic 1,2 dicarboxylic compound having an alpha-beta-enal group, said dicarboxylic compound having a substituent selected from the group consisting of hydrogen and an alkyl group having 1 to 3 carbon atoms, reacting the resultant condensation product with ammonia to produce an imide of said condensation product, and thereafter reacting the imide of said condensation product with an hydroxy-ether-halohydrin to produce the alkanol-ether-imide.

5. A process for preparing an alkanol-ether-imide which comprises condensing an olefinic hydrocarbon compound having 8 to 24 carbon atoms per molecule with an aliphatic 1,2 dicarboxylic compound having an alpha-beta-enal group, said dicarboxylic compound having a substituent selected from the group consisting of hydrogen and an alkyl group having 1 to 3 carbon atoms, reacting the resultant condensation product with ammonia to produce an imide of said condensation product, reacting the imide of said condensation product with a compound selected from the group consisting of alkyl halohydrins and alkene oxide derivatives of alkyl halohydrins to produce an alkanol-imide derivative thereof, and reacting the resultant alkanol-imide derivative with an alkene oxide to form the alkanol-ether-imide.

JOHN ROSS.
ARTHUR IRA GEBHART.

References Cited in the file of this patent

UNITED STATES PATENTS

| Number | Name | Date |
|---|---|---|
| 2,182,178 | Pinkernelle | Dec. 5, 1939 |
| 2,262,923 | Clocker | Nov. 18, 1941 |
| 2,452,315 | Morgan | Oct. 26, 1948 |
| 2,469,493 | Barker | May 10, 1949 |
| 2,487,106 | Cornwell | Nov. 8, 1949 |
| 2,496,358 | Ross | Feb. 7, 1950 |